June 25, 1940.  B. ZIMMER  2,205,917
EGG WEIGHING SCALE
Filed April 8, 1938   2 Sheets-Sheet 1

Inventor
Benjamin Zimmer
By his Attorneys

June 25, 1940.　　　B. ZIMMER　　　2,205,917
EGG WEIGHING SCALE
Filed April 8, 1938　　　2 Sheets-Sheet 2
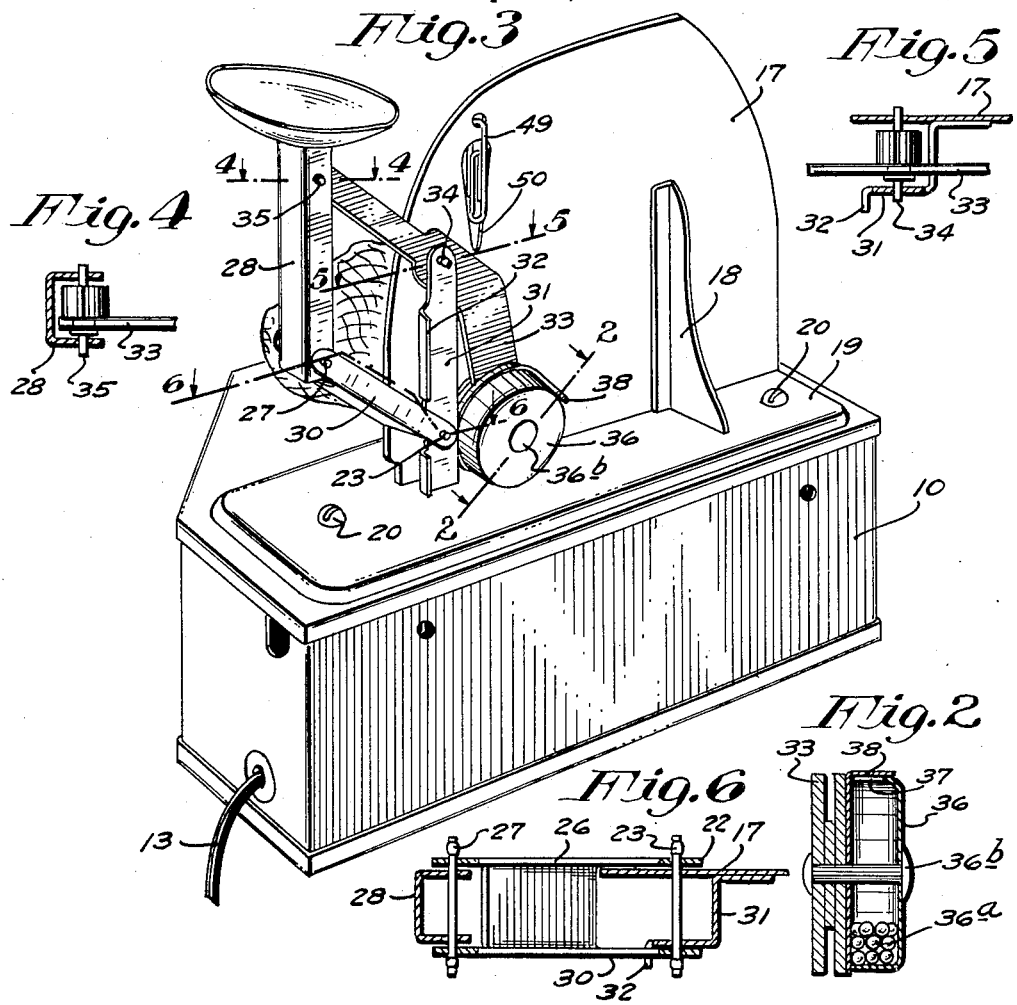
Inventor
Benjamin Zimmer
By his Attorneys Patented June 25, 1940

2,205,917

UNITED STATES PATENT OFFICE 2,205,917

EGG WEIGHING SCALE

Benjamin Zimmer, Minneapolis, Minn.

Application April 8, 1938, Serial No. 200,894

4 Claims. (Cl. 265—61)

My invention provides an extremely simple and highly efficient egg weighing scale and, generally stated, consists of the novel devices, combination of devices and arrangement of parts herewith described and defined in the claims.

The commercial device involving the invention is of such character that when an egg is placed on the scale, the weight of the individual egg will be indicated in ounces and fractions thereof, and the weight per dozen of such eggs will also be simultaneously indicated. The scale has a dial which is also preferably marked with common designations such as "Extra large," "Large," "Medium" and "Small."

The above indicated and other novel features will appear in the description of the commercial form of the device illustrated in the accompanying drawings wherein like characters indicate like parts throughout the several views.

Referring to the drawings:

Fig. 2 is a detail in section taken on the line 2—2 of Fig. 3;

Fig. 3 is a perspective view showing the device in rear elevation; and

Figure 1:
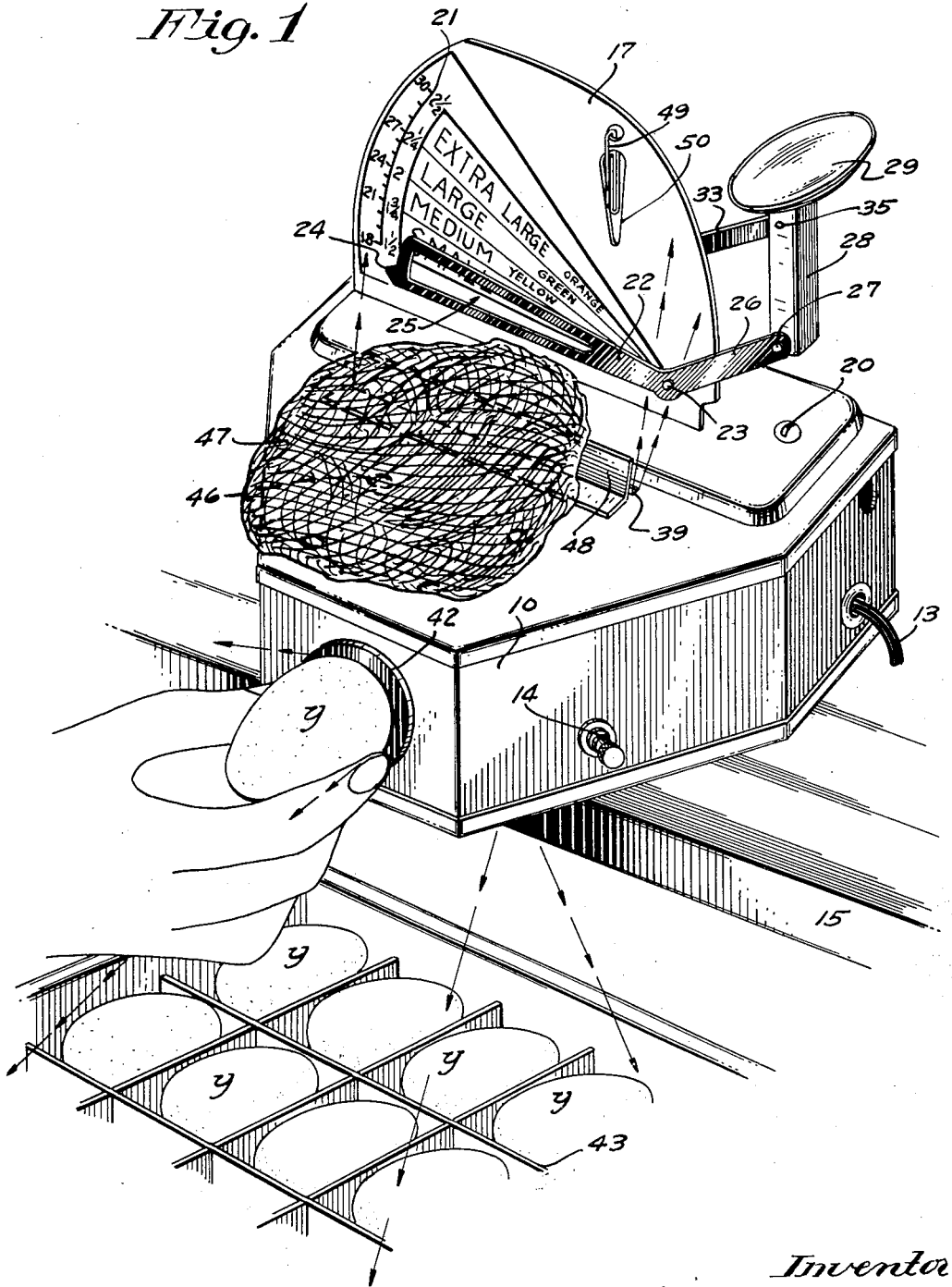
Fig. 1 is a perspective showing in front elevation the improved device placed on a table with a crate of eggs below and in front of the table.

Figs. 4, 5 and 6 are sections taken respectively on the lines 4—4, 5—5 and 6—6 of Fig. 3.

The numeral 10 indicates a support in the form of a light box and in which there may be an electric light bulb not shown but which may receive current through a cable 13 under control of a switch 14.

In the drawings, see particularly Fig. 1, the light box, as shown, is detachably secured to a table 15 by a wood screw 16. The scale mechanism, as shown, includes an upright dial, preferably in the form of a light sheet metal plate, 17 secured by bracket 18 to a base flange 19, which latter, as shown, is detachably secured to the top of the light box 10 by nut-equipped bolts 20. The front plate of the dial 17, as preferably designed, is zoned or marked off, as shown, in Fig. 1, by radiating lines and spaces in which are marked "Extra large," "Large," "Medium," and "Small"; and outward of the said zones is segmental scale graduation 21. Inward of the segmental scale graduation 21, at proper spaces thereof but radially inward thereof, are numerals that indicate the weight of the individual egg being weighed; but just radially outward of said scale graduation are numerals, properly spaced, to indicate the weight per dozen of the individual eggs being weighed.

For cooperation with the scale dial 17 is an indicator arm 22 that is pivoted to said dial at 23, which is the point of divergence of the radiating lines. At its free end, this indicator arm 22 is provided with a pointer 24 that cooperates with the graduations and markings of the scale graduation 21. Also, the arm 22 is formed with a long slot or sight passage 25 through which may be read the above noted words marked in the diverging segments of the dial.

At its pivoted end the indicator arm 22 is provided with an extension 26, that is pivoted by a pin 27 to the lower end of a stem 28, on the upper end of which, is an egg receptacle or holder 29, corresponding somewhat to the scoop of ordinary scales. In this preferred form, the arm projection 26 is formed with a laterally projecting plate that terminates in an upturned link-forming flange 30. The stem 28, preferably and as shown, is a light metal channel to which the extended end of the link flange 30, as well as the body of the arm 22, is pivotally connected by a pin 27. The inner end of the link-forming flange is pivotally connected to a column forming bracket 31 by the above noted pivoted pin 23, which is extended also through the bracket 31. This bracket 31 has a flange on the inner end, see particularly Fig. 6, that is riveted, spot welded, or otherwise rigidly secured to the back of the dial 17. Also, the bracket 31 as shown, has an out-turned flange 32 that is notched to afford clearance of the link-forming flange 30 at the upper portion of stem 28, and hence the egg receptacle 29 is held in position by a weighted scale lever. This scale lever 33, by pivot pin 34, is pivoted to the upper end of the bracket 30 and to the dial 17. The free end of the lever 33 is pivotally connected to the upper portion of the stem 28 by pin 35. The projecting portion of the lever 33 and the link formed by the flange 30, and cooperating portion of the indicator arm 22, work in parallel to hold the stem 28 upright throughout its movements. The weight at the inner end of the lever 33 is preferably afforded by a sheet metal casing 36 containing shot 36a. This casing, as shown, is secured to said lever by an axial rivet 36b, and at its top is provided with an entrance passage 37 normally closed by a bendable lip 38, see particularly Fig. 2.

The box or casing 10 is provided in its top with a light passage 39, in its bottom with a light passage 40 and in its front wall with a large light passage 41 that is preferably formed in an annular frame 42 of rubber or other slightly pliable material. The light passage 39 is so located in respect to the lamp 11 and the dial 17 that the lamp will project a beam of light on to the face of said dial. The light passage 40 is so located that it will project a light beam through the lamp on to eggs Y contained in an egg case 43 located in front of the table 15, and below the projecting portion of the light box.

Secured to the top of the light box and extended along the light passage 39 is a deflecting flange 48 that assists in deflecting the light onto the dial and also assists in holding the metallic wool 47 out of the line of the light projection. Numeral 49 indicates a gravity suspended pendulum which, as shown, is pivoted to the dial 17 and works in a slot 50 formed with the dial to indicate when the light box is set level or in a horizontal plane.

It will be noted that when the device is viewed from the front, or looking toward the graduated face of the dial, the weighted head and lower end of the lever 33 are hidden from view.

What I claim is:

1. In a device of the kind described, a base, a dial secured to and projecting upward from said base and marked to indicate the different weights, an indicator arm in the form of a lever intermediately pivoted to and working over the graduated dial at the front face thereof, a weighted lever intermediately pivoted at the back of said dial, said indicator and weighted lever having ends projecting beyond the dial at different altitudes, and a stem pivotally supported by the projecting ends of said levers and having means adapted to hold an egg.

2. The structure defined in claim 1 in further combination with a bracket secured to said base and spaced from the back of said dial, said indicator lever having a laterally offset portion formed with a flange acting as a link connection between said bracket and the lower end of said stem, said weighted lever having its pivotal connection also with the upper end of said bracket.

3. The structure defined in claim 1 in which said weighted lever has a weighted head located back of said dial where it is out of view from the front of the dial.

4. In a device of the kind described, a base, a dial projecting from said base, a weighing indicator arm intermediately pivoted to said dial and an article holding device carried at the end of said arm, said dial having differently marked indicating zones radiating from the pivotal connection between said arm and dial, and at the extremity of said radial indicating zones having other graduations segmentally arranged, said arm at its extremity having an indicating point co-operating with the last noted scale marking, and said arm having a longitudinal slot cooperating with said radiating indicating zones and through which slot the markings on said radiating zones may be observed.

BENJAMIN ZIMMER.